United States Patent
Gage et al.

(10) Patent No.: US 6,860,644 B2
(45) Date of Patent: Mar. 1, 2005

(54) DUAL FIBER COLLIMATOR ASSEMBLY POINTING CONTROL

(75) Inventors: Edward C. Gage, Apple Valley, MN (US); Timothy S. Gardner, Eden Prairie, MN (US); Ronald E. Gerber, Richfield, MN (US); John J. Taranto, Mercerville, NJ (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 211 days.

(21) Appl. No.: 09/999,891

(22) Filed: Oct. 31, 2001

(65) Prior Publication Data

US 2003/0081908 A1 May 1, 2003

(51) Int. Cl.⁷ .............................. G02B 6/293; G02B 6/34
(52) U.S. Cl. .............................. 385/74; 385/24; 385/33; 385/36; 385/16; 385/18
(58) Field of Search ................................ 385/16–23, 24, 385/33–36, 27, 40, 47, 48, 50–52

(56) References Cited

U.S. PATENT DOCUMENTS

| | | |
|---|---|---|
| 4,213,677 A | 7/1980 | Sugimoto et al. |
| 4,474,424 A | 10/1984 | Wagner |
| 4,550,975 A | 11/1985 | Levinson et al. |
| 5,539,577 A | 7/1996 | Si et al. |
| 5,612,824 A | 3/1997 | Si et al. |
| 5,781,341 A | 7/1998 | Lee |
| 5,799,121 A | 8/1998 | Duck et al. |
| 5,845,023 A | 12/1998 | Lee |
| 5,889,904 A | 3/1999 | Pan et al. |
| 5,917,626 A | 6/1999 | Lee |
| 6,002,818 A | * 12/1999 | Fatehi et al. .................. 385/17 |
| 6,040,944 A | 3/2000 | Pan et al. |
| 6,055,347 A | 4/2000 | Li et al. |
| 6,084,994 A | 7/2000 | Li et al. |
| 6,160,932 A | * 12/2000 | Huang et al. ................. 385/24 |
| RE37,044 E | 2/2001 | Wu |
| 6,185,347 B1 | 2/2001 | Zheng |
| 6,198,858 B1 | * 3/2001 | Pan et al. ...................... 385/24 |
| 6,415,067 B1 | * 7/2002 | Copner et al. ................ 385/16 |
| 6,430,337 B1 | * 8/2002 | Bergmann et al. ........... 385/25 |
| 6,477,289 B1 | * 11/2002 | Li ................................. 385/16 |
| 2001/0046345 A1 | * 11/2001 | Snyder et al. ................ 385/16 |
| 2002/0101634 A1 | * 8/2002 | Ye ................................ 359/122 |
| 2002/0106153 A1 | * 8/2002 | Wu et al. ...................... 385/33 |

FOREIGN PATENT DOCUMENTS

| | | | | |
|---|---|---|---|---|
| JP | 09304647 A | * | 11/1997 | ........... G02B/6/293 |
| JP | 2001147341 A | * | 5/2001 | ........... G02B/6/293 |

* cited by examiner

Primary Examiner—Hemang Sanghavi
Assistant Examiner—Scott A Knauss
(74) Attorney, Agent, or Firm—Carlson, Caspers, Vandenburgh & Lindquist

(57) ABSTRACT

Generally, the present invention relates to a fiber optic device that is easier to align than conventional devices, and to a method for aligning such devices. An embodiment of the invention includes a first focusing element having an optical axis and a first focal length, and a first optical fiber optically coupled to a first side of the first focusing element. The first optical fiber is disposed at a first transverse distance from the optical axis so that light from the first optical fiber propagates on a second side of the first focusing element as a substantially collimated beam at a first angle to the optical axis. A wedged optical element is optically coupled to the second side of the first focusing element and deviates the substantially collimated beam so as to propagate in a direction substantially parallel to the optical axis.

31 Claims, 8 Drawing Sheets

DUAL FIBER COLLIMATOR ASSEMBLY POINTING CONTROL

FIELD OF THE INVENTION

The present invention is directed generally to fiber optical components, and more particularly to a fiber optic based on a dual fiber collimator.

BACKGROUND

Optical fibers find many uses for directing beams of light between two points. Optical fibers have been developed to have low loss, low dispersion, polarization maintaining properties and can also act as amplifiers. As a result, optical fiber systems find widespread use, for example in optical communication applications.

However, one of the important advantages of fiber optic beam transport, that of enclosing the optical beam to guide it between terminal points, is also a limitation. There are several optical components, important for use in fiber systems or in fiber system development, that are not implemented in a fiber based form where the optical beam is guided in a waveguide. Instead, these optical components are implemented in a bulk form and through which the light propagates freely. Examples of such components include, but are not limited to, filters, isolators, circulators, polarizers, switches and shutters. Consequently, the inclusion of a bulk component in an optical fiber system necessitates that the optical fiber system have a section where the beam path propagates freely in space, rather than being guided within a fiber.

Free space propagation typically requires use of collimation units at the ends of the fibers to produce collimated beams. In some units, the same focusing element is used to collimate the beams from two different fibers placed at different positions relative to the axis of the focusing optic. This produces collimated beams that propagate in non-parallel directions. The non-parallel propagation of the collimated beams introduces extra issues for aligning the components of the device, and may place some limits on making the device smaller in size.

Accordingly, there is a need for an improved approach to introducing a free-space propagation section into fiber optic systems that is simple to align and is more compact.

SUMMARY OF THE INVENTION

Generally, the present invention relates to a fiber optic device that is easier to align than conventional devices, and to a method for aligning such devices.

One particular embodiment of the invention is directed to a fiber collimator unit that includes a first focusing element having an optical axis and a first focal length, and a first optical fiber optically coupled to a first side of the first focusing element. The first optical fiber is disposed at a first transverse distance from the optical axis and at a distance from the first focusing element of approximately the first focal length so that light from the first optical fiber propagates on a second side of the first focusing element as a substantially collimated beam at a first angle to the optical axis. A wedged optical element is optically coupled to the second side of the first focusing element and deviates the substantially collimated beam so as to propagate in a direction substantially parallel to the optical axis.

Another embodiment of the invention is directed to an optical system that includes an optical transmitter producing output light, an optical receiver receiving at least a portion of the output light, and an optical fiber link coupling between the optical transmitter and the optical receiver. The optical fiber link includes a first optical fiber optically coupled to the optical transmitter and a first lens having an optical axis and a focal length. The first optical fiber and a second optical fiber are positioned on an input side of the first lens element on opposite sides of the optical axis and at a distance from the first focusing element of approximately the focal length so that light from the first optical fiber propagates on a second side of the first focusing element as a substantially collimated beam at a first angle to the optical axis. A wedged optical element is disposed on a second side of the first focusing element and transmits at least a portion of the substantially collimated beam in a direction substantially parallel to the optical axis. A second focusing element is disposed to focus light transmitted through the wedged optical element to a third optical fiber. The optical receiver is optically coupled to receive light from one of the second or the third optical fibers.

Another embodiment of the invention is directed to an optical unit that includes a first focusing unit defining an optical axis and a second focusing unit spaced apart from the first focusing element. At least first and second fiber ports are disposed on a first side of, and optically coupled through, the first focusing element, and at least a third fiber port is disposed on a second side of the second focusing unit opposite the first focusing unit. A wedged optical element disposed between the first and second focusing units directs collimated light passing from the first fiber port to the third fiber port to be substantially parallel to the optical axis.

Another embodiment of the invention is directed to a method of aligning light in an in-line fiber optic device. The method includes transmitting light from a first port disposed towards a first end of the device through a wedged optical element disposed on an optical axis, and propagating the light transmitted through the wedged optical element to a second optical element disposed on the optical axis. The method also includes rotating the wedged optical element about the optical axis to adjust an angle of incidence of the light on the second optical element to a desired value of the angle of incidence.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
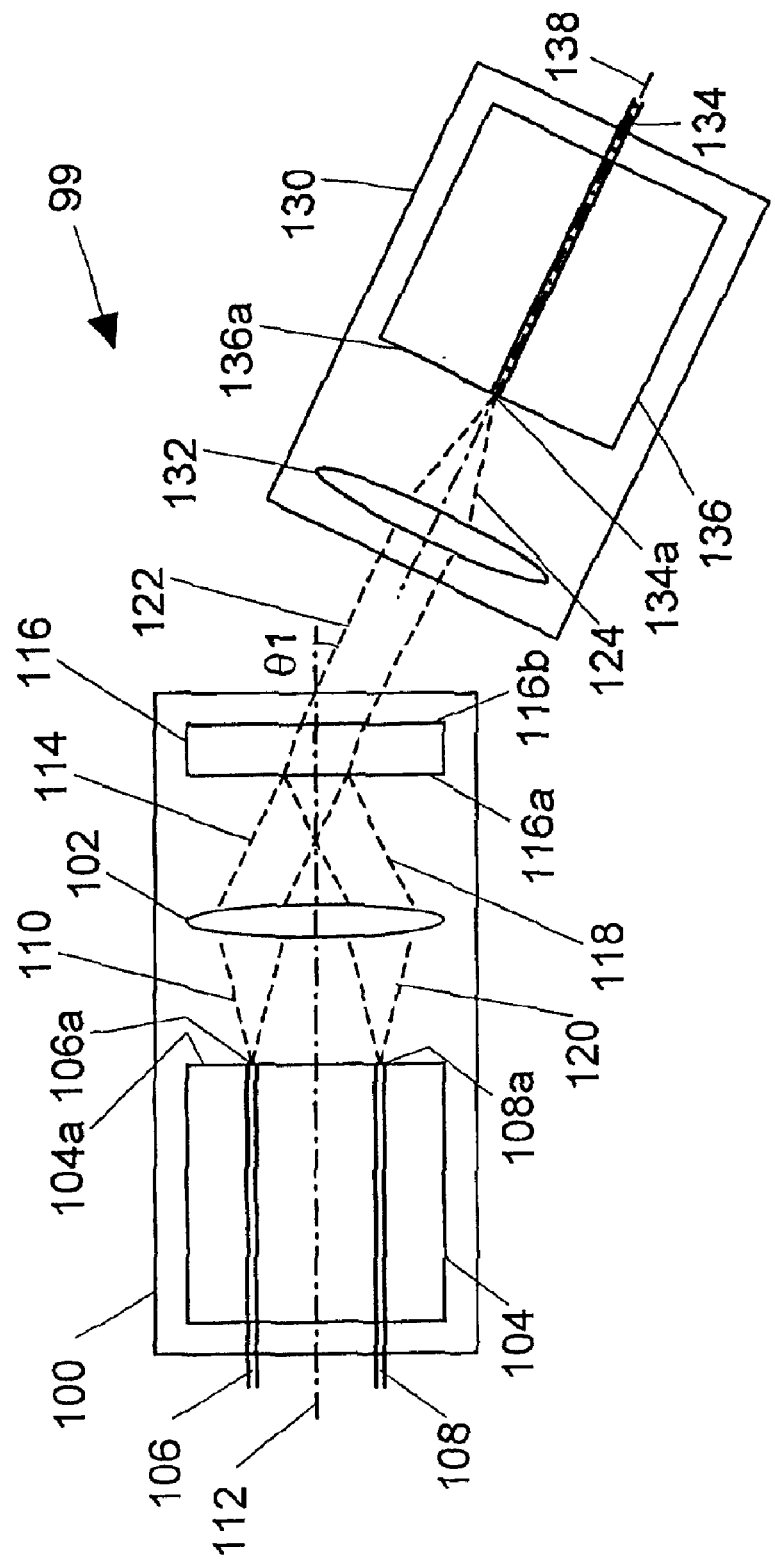
FIG. 1A schematically illustrates a three port, fiber optical filter unit.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to fiber optic devices, and is believed to be particularly useful with fiber optic devices that use one or more dual fiber collimator assemblies, such as filter units.

A dual-fiber collimator (DFC) assembly is an important building block for optical add/drop multiplexers, monitor arrays, and hybrid assemblies. A typical design for a DFC 100 is shown in FIG. 1A, which schematically illustrates a three port, filter-based optical device 99. The device may be a multiplexer/demultiplexer, add/drop filter, power tap, or the like. The dual-fiber collimator 100 includes a first lens 102 and dual-fiber ferrule 104. Two fibers 106 and 108 are held in the ferrule 104, with their ends 106a and 108a positioned at a distance from the lens 102 equal to about the focal length of the lens 102. The ferrule end 104a, and the fiber ends 106a and 108a may be polished at a small angle to prevent reflections feeding to other elements.

In the illustrated embodiment, a first light beam 110, from the first fiber 106, passes through the lens 102 and is collimated. However, since the beam 110 is not positioned on the lens axis 112, the collimated beam 114 propagates at an angle, $\theta 1$, to the axis 112. For typical systems, the value of $\theta$ may be around 2°, depending on such factors as the focal length of the lens 102 and the separation between the two fibers 106 and 108.

The collimated beam 114 is incident on the filter 116, which reflects a portion of the beam 114 as a reflected beam 118, and transmits the remainder of the beam 114 as a transmitted beam 122. The reflected beam 118 is reflected to the first lens 102 which focuses the beam 120 to the second fiber 108.

The transmitted beam 122 passes through the filter 116 to a single fiber collimator unit (SFC) 130. The SFC 130 includes a lens 132 and a fiber 134 that is held in the single fiber ferrule 136. When used in conjunction with the DFC 100 and the filter 116, the transmitted beam 122 is focused by the lens 132 into the third fiber 134 as beam 124. In this embodiment, the third fiber 134 is disposed on the axis 138 of the lens 132, and the SFC 130 is oriented so that the beam 122 from the DFC 100 is parallel to the axis 138. The ferrule end 136a and the fiber end 134a may be polished at a small angle to prevent reflections feeding back to other elements.

The element 116 may be a filter having a multilayer dielectric filter coating, typically on the first surface 116a, with the second surface 116b having an anti-reflection coating. The filter 116 may be, for example, a wavelength dependent beamsplitter. This is useful for multiplexing/demultiplexing, or adding or dropping channels in a WDM or DWDM optical communications system. The filter 116 may also split off a fraction of the incident light over the entire wavelength band of interest, in order to make a power measurement. The filter 116 may also perform other functions.

In the embodiment illustrated in FIG. 1A, the two surfaces 116a and 116b of the filter 116 are nominally parallel. The filter 116 may be wedged at a small angle, on the order of 1° or less, so that reflections from the second side 116b of the filter do not propagate along the same direction as the reflected beam 118, and etalon effects between the front and back surfaces 116a and 116b are, therefore, avoided.

Figure 1B:
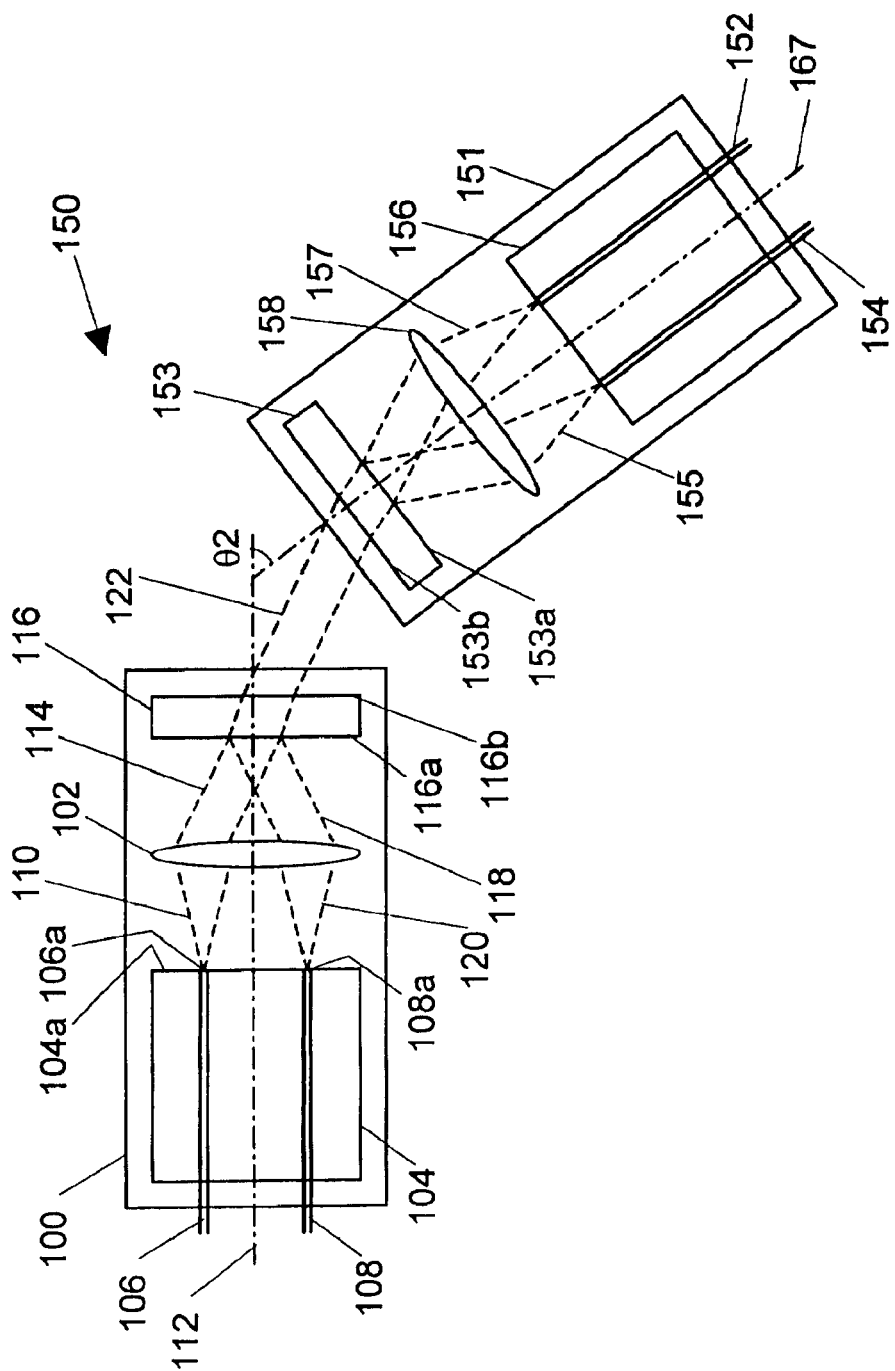
FIG. 1B schematically illustrates a four port, fiber optical filter unit.

An embodiment of a four port, filter based device 150 is illustrated in FIG. 1B. The first DFC 100 is the same as in the embodiment illustrated in FIG. 1A. However, the right side of the device 150 includes a second DFC 151 having a third and fourth fiber 152 and 154 in a dual fiber ferrule 156. The light 122 transmitted from the filter 116 is focused by the lens 158 into the third fiber 152. Light 155 entering the device 150 from the fourth fiber 154 is typically collimated by the lens 158, and may be incident on the first surface 153a of the filter 153 to combine with the light 122 transmitted through the filter 153. The second DFC 151 has an axis 167 that is set at an angle, $\theta 2$, relative to the axis 112 of the first DFC 100.

Where a multichannel optical communications signal enters the device 150 through the first fiber 106, one or more selected channels may be reflected by the filter 116 to the second fiber 108, while the remaining channels are directed to the output port at the third fiber 152. Optical channels may be added to the multiple channel signal at the third fiber 152 by adding light 155 from the fourth fiber 154 which reflects off the second filter 153. In some situations, the optical channels being dropped to the second fiber 108 have wavelengths similar to those of the channels being added through the fourth fiber 154.

Figure 2A:
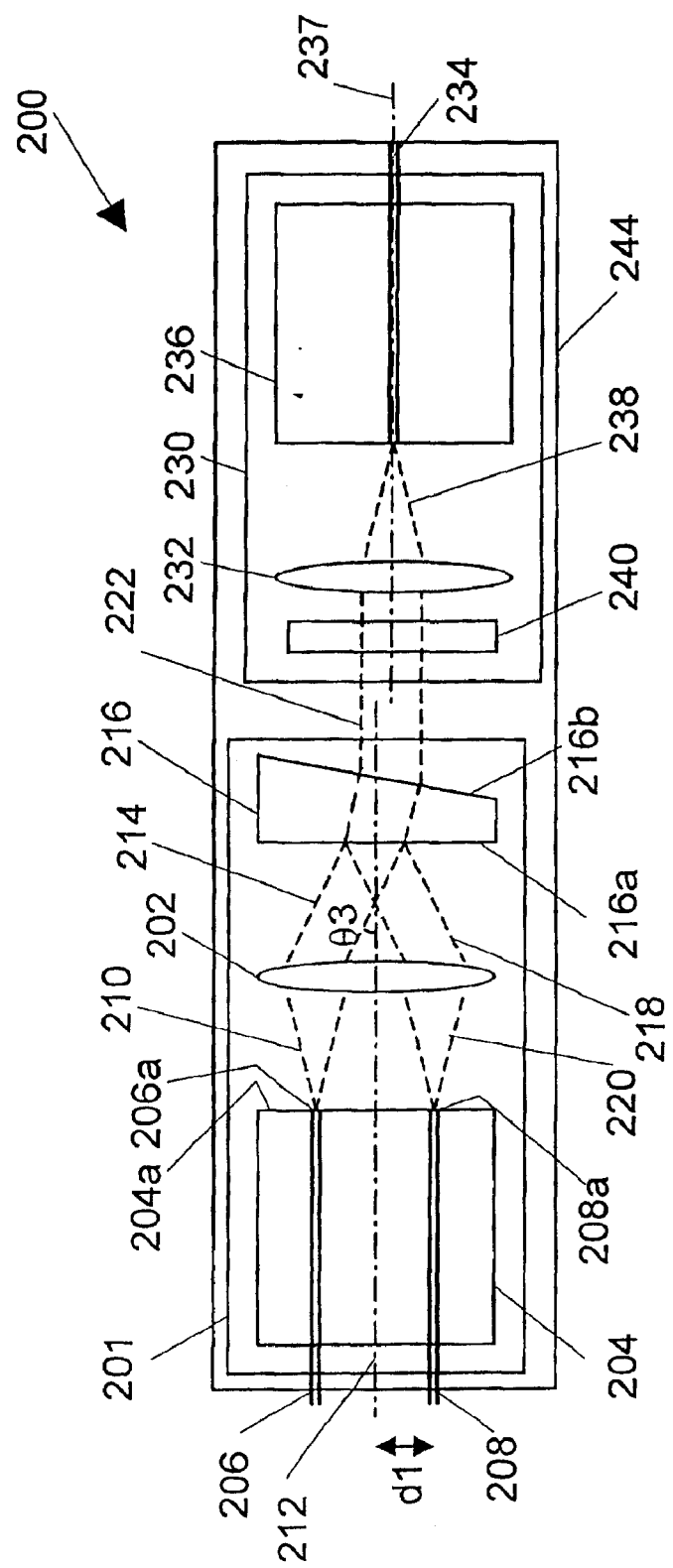
FIGS. 2A–2C schematically illustrate embodiments of optical fiber unit according to the present invention.

One particular embodiment 200 of the invention is illustrated in FIG. 2A, which shows a DFC 201 coupling light to an SFC 230. The DFC 201 includes two fibers 206 and 208 held in a dual-fiber ferrule 204. The ferrule end 204a and the fiber ends 206a and 208a may be polished at a small angle to prevent reflections feeding to other elements. It will be understood that some of the beams, for example beam 210 from the first fiber 206, may be diverging or converging or may, like beam 214, be substantially collimated.

Beam 210 from the first fiber 206 diverges towards the lens 202. The lens 202 may be any suitable type of lens, such as a spherical or aspherical lens, having at least one curved surface, or may be a gradient index (GRIN) lens. Beam 214 propagating from the lens 202 is substantially collimated and, since the first fiber 206 is positioned at a distance d1 from the axis 212 of lens 202, beam 214 propagates at an angle $\theta 3$ relative to the axis 212.

Beam 214 is incident on optical element 216, which reflects light as beam 218 to the lens 202 which redirects and focuses the beam 220 to the second fiber 208. The optical element 216 is wedged at an angle, for example greater than around 2°, and perhaps around 4°, so that refraction of the transmitted beam 222 directs the beam 222 along a direction substantially parallel to the optical axis 212 of the first lens 202, to the SFC 230. The beam 222 is focused in a lens 232 into a third fiber 234 held in a single fiber ferrule 236.

In this embodiment, the axis 237 of the SFC 230 is substantially parallel to the axis 212 of the DFC 201, and the axis 237 of the SFC 230 is translated by a small amount off to the side from the axis 212 of the DFC 201. This may be compared with the embodiment illustrated in FIG. 1A, where the axis 138 of the SFC 130 is set at an angle, $\theta 1$, relative to the axis 112. An advantage provided by the embodiment 200 illustrated in FIG. 2A is that, since the axes 212 and 237 are substantially parallel to each other, it is easier to align the SFC 230 to the DFC 201, than it is to align the SFC 130 to the DFC 100.

It will be appreciated that beams may propagate through the device 200 in directions different from those just described, for example so that light entering the device 200 through the second and third fibers 208 and 234 is combined at the optical element 216 and propagates to the first fiber 206.

The optical element 216 may be, for example, a filter that reflects light in a selected wavelength range. The filter 216 may have a reflective coating on a first surface 216a and an antireflective coating on a second surface 216b. Such an optical element 216 may permit the device to operate as a multiplexer (MUX) or, a demultiplexer (DMUX), or an optical add-drop multiplexer (OADM). In an example illustrating the operation of a MUX, light at one wavelength, or wavelength range, may enter the device through the second fiber 208, and be reflected by the optical element 216 towards the first fiber 208. Light at another wavelength, or wavelength range, may enter the device through the third fiber 234 and be transmitted to the first fiber 206 through the optical element 216. Thus, the output from the first fiber 206 is a combination of the light entering the device from both the second and third fibers 206 and 234.

In an example illustrating the operation of a DMUX, light having components at two different wavelengths, or wavelength ranges, may enter the device through the first fiber 206. Light at one of the wavelengths or wavelength ranges is reflected by the optical element 216 towards the second fiber 208 while light at the other wavelength or wavelength range is transmitted to the third fiber 234.

The light entering the device may, instead of comprising two wavelengths or wavelength ranges, include several different wavelengths to form a multiple channel optical communications signal. The optical element may be set to reflect light in one or more particular channels, and transmit light in the other channels. Therefore, depending on the direction of the light entering the device and the range of wavelengths over which the optical element 216 is reflective, the device may drop one or more channels from the multiple channel signal or may add one or more channels to the multiple channel signal.

Optionally, another element 240 may be included in the device. For example the other element 240 may be an optical isolator, a circulator or a filter element, a polarizer or an attenuator.

The device 200 provides significant advantages, particularly in assembling the device. The DFC 201, including the optical element 216, and the SFC 230 are held in a housing 244, which is typically cylindrical, although is not limited to being cylindrical. One of the advantages of the device 200 is that the beam 222 propagates within the housing 244 in a direction that is parallel to the optical axis 212 and to the mechanical axis of the housing 244. This may permit simpler alignment of the SFC 230. Another advantage is that the parallel output beam enables use of autocollimation methods during construction of the dual-fiber collimator. This also allows for a narrower acquisition range for further alignments. Another advantage provided by the present invention is that, since the fiber 234 may be placed closer to the axis 212, alignment of the SFC 230 is less sensitive to rotation of the SFC 230 about the optical axis 212. Furthermore, the device 200 may be less susceptible to thermal effects caused, for example, by thermal expansion of components in a radial direction.

In an example of a device 200 as illustrated in FIG. 2A, the fibers 206 and 208 may have a diameter of around 125 $\mu$m and are set in the dual-fiber ferrule 204 at a center-to-center spacing of 125 $\mu$m. The lenses 202 and 232 may be aspherical lenses having a focal length in the range 1.5–2.5 mm, and so θ3 has a value of approximately 1.5°–2.5°. The optical element 216 may be based on a glass substrate, for example BK7 or B270 glass, and have a wedge angle of around 2°–5°. It is to be understood that the values for the various components provided in this paragraph are provided for illustrative purposes only, and are not intended to limit the invention in any way.

Figure 2B:
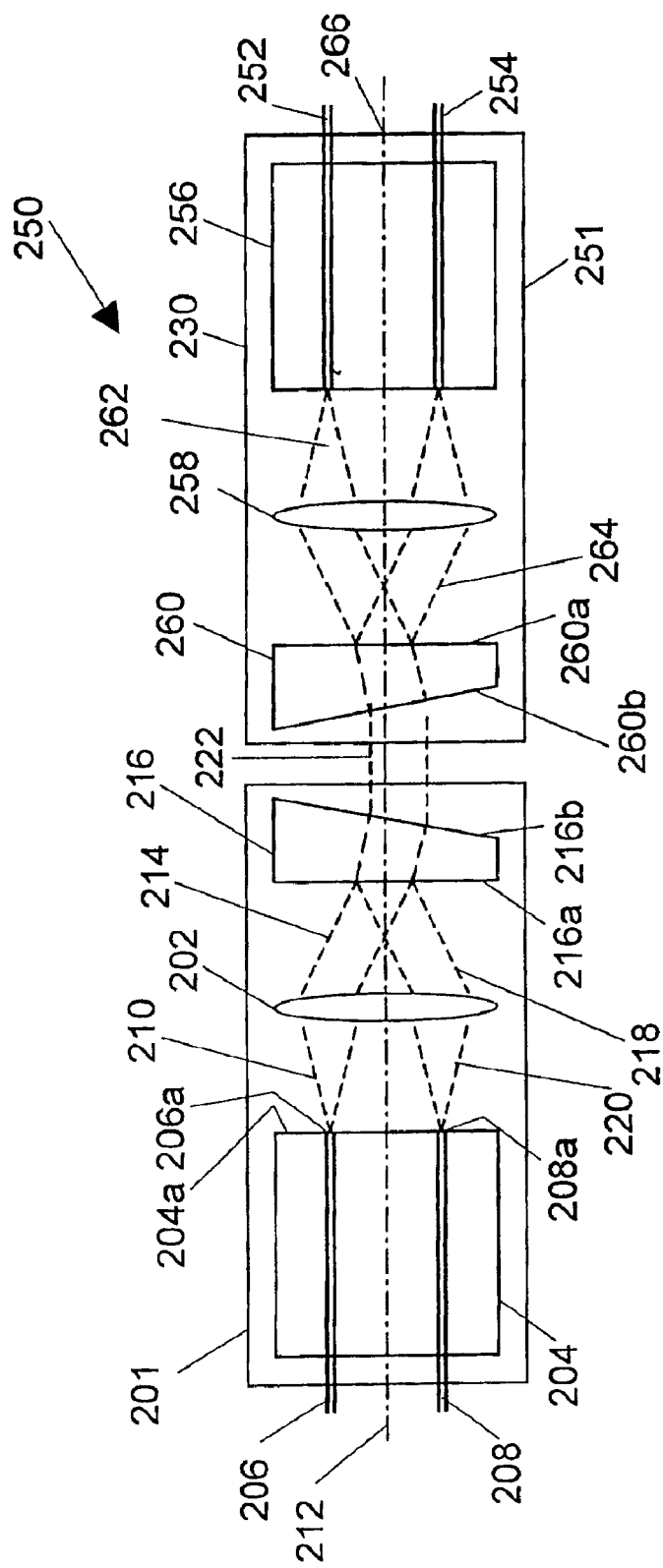

The arrangement illustrated in FIG. 2A may also be adapted for use in higher-level modules that use multiple dual-fiber or multiple-fiber collimator assemblies. Specifically, a parallel transmitted beam may permit a narrower acquisition range for further alignments. Another embodiment of a device 250 is schematically illustrated in FIG. 2B, in which the DFC 201 is coupled to another DFC 251. The second DFC 251 includes third and fourth fibers 252 and 254 mounted in a dual fiber ferrule 256. Light 222 passing from the optical element 216 is directed through another wedged optical element 260 to the lens 258 which focuses the light 262 into the third fiber 252.

The optical element 260 may be a filter, and may have a reflective coating disposed on the first surface 260a and an antireflection coating disposed on the second surface 260b. Light 264 entering the device 250 from the fourth fiber 254 may be reflected by the optical element 260, to overlap with the light 222 transmitted from the first optical element 216, and be transmitted to the third fiber 252.

In this embodiment, the axis 212 of the first lens 202 and the axis 266 of the second lens 258 may be parallel, assuming that the wedge angles of the first and second optical elements 216 and 260 are the same. Furthermore, if the DFC 201 and 251 are symmetric, then the axes 212 and 266 may be also be coincident, since the second optical element 260 is oriented so that the deviation from passing through the wedge of the second optical element 260 compensates for the deviation of the beam 222 passing through the first optical element 216.

Figure 2C:
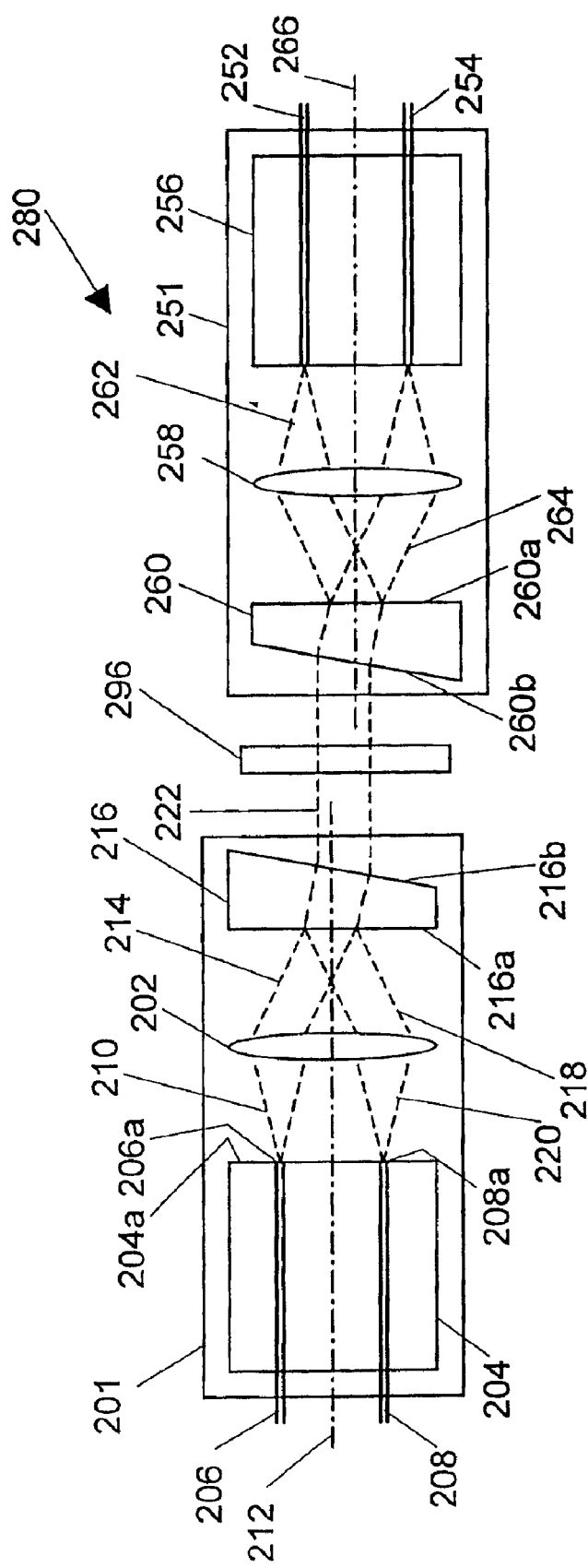

Another embodiment of a dual DFC device 280 is schematically illustrated FIG. 2C. The device 280 includes components similar to those of the device 250. However, the second optical element 260 is oriented so that the deviation from passing through the wedge of the second optical element 260 adds to the deviation of the beam 222 passing through the first optical element 216. Thus, in this case, although the axes 212 and 266 are parallel, the axes are not coincident. An element 296 positioned between the DFCs 201 and 251, for example an isolator, may make use of the offset between the two axes 212 and 266.

Figure 3:
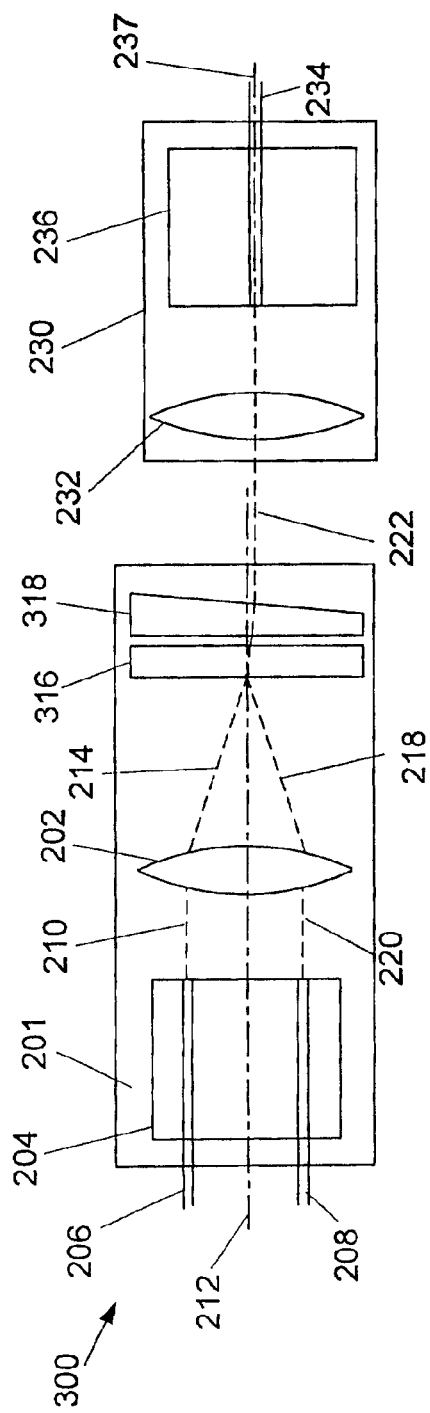
FIG. 3 schematically illustrates another embodiment of an optical fiber unit according to the present invention.

Another embodiment of a device 300 is illustrated in FIG. 3. This embodiment is similar to that of FIG. 2A, except that the optical element 316 is nearly parallel, for example having an angle of around 0.5°, and is complemented by a wedged element 318 that deviates the transmitted beam 222 by a sufficiently large amount so as to propagate parallel to the axis 212. Only the central ray of each beam is illustrated, for clarity. This embodiment is advantageous when the optical element by itself 316 does not provide sufficient refraction as to make the beam 222 parallel to the axis 212.

Figure 4:
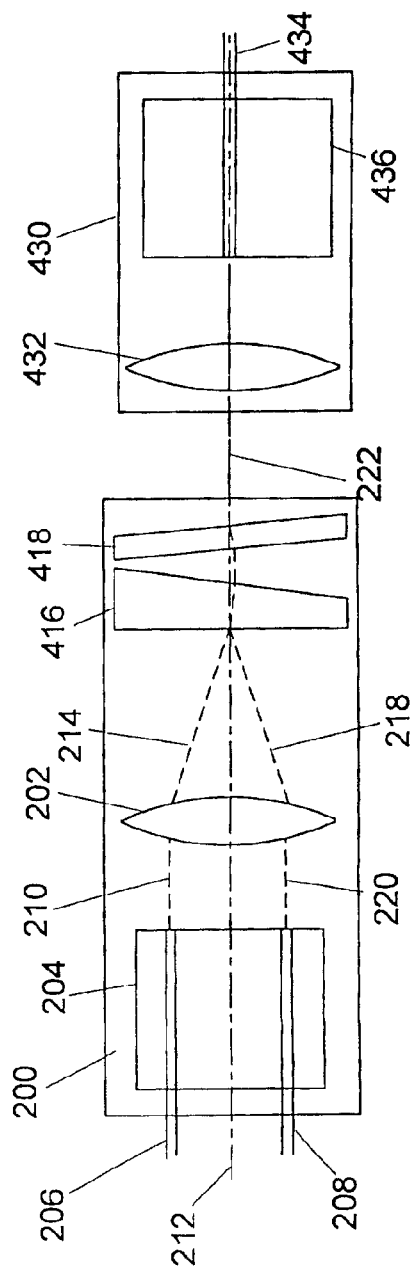
FIG. 4 schematically illustrates another embodiment of an optical fiber unit according to the present invention.

Another embodiment of the invention is provided in FIG. 4. In this embodiment, a compensation plate 418, typically a parallel plate disposed in the transmitted beam 222, is used to redirect the beam 222 on to the optical axis 212. The compensation plate 418 is disposed at an angle that is dependent on the thickness of the plate 418 and its refractive index. The beam 222 may pass into the SFC 430 where it is focused by the lens 432 into the fiber 434 held in the single-fiber ferrule 436. An advantage of this embodiment is that alignment of the SFC 430 is simpler since there is no offset between the fiber 434 and the axis 212.

Another aspect of the invention is now discussed with reference to FIGS. 5A–5C, and relates to the embodiments 250 and 280 of DFC-DFC devices described earlier. Light 510 is incident on a first wedged element 516 disposed on an axis 512, and having a first wedge angle. A first portion of light 511 may be reflected by the first surface 516a of the first element 516, while a second portion of light is transmitted through the first element 516. In the illustrated embodiment, the first surface 516a is perpendicular to the axis 512, while the second surface 516b is not perpendicular to the axis 512. The first wedged element 516 may be a filter having a reflective coating that selectively transmits and reflects different portions of the spectrum of light incident on the filter, or that transmits a specified fraction of the incident light.

The light 522 transmitted through the first wedged element 516 is incident on a second element 560, such as a filter, that transmits some light 562. The transmitted light 562 may fall within a specific wavelength range determined by a reflective coating disposed on one of the surfaces 560a and 560b of the second element 560. The second element 560 may also be wedged, with a second wedge angle.

The first wedged element 516 may be rotated about the axis 512 to adjust the angle of incidence, α, of the light 522 on the second element 560. In the example illustrated in FIG. 5A, the thick edge of the first wedged element 516 is positioned towards the top of the figure, so that the light 522 is incident on the second element 560 at a first incident angle, α1. In this particular example, the second element 560 is wedged and has a wedge angle selected so that the transmitted light 562 propagates parallel to the axis 512. It will be appreciated, however, that this is not a requirement, and that the light 562 may propagate at different angles relative to the axis 512. Furthermore, it will be appreciated that the second element 560 need not be a wedged element and may be another type of optical element, for example a lens.

Figure 5A:
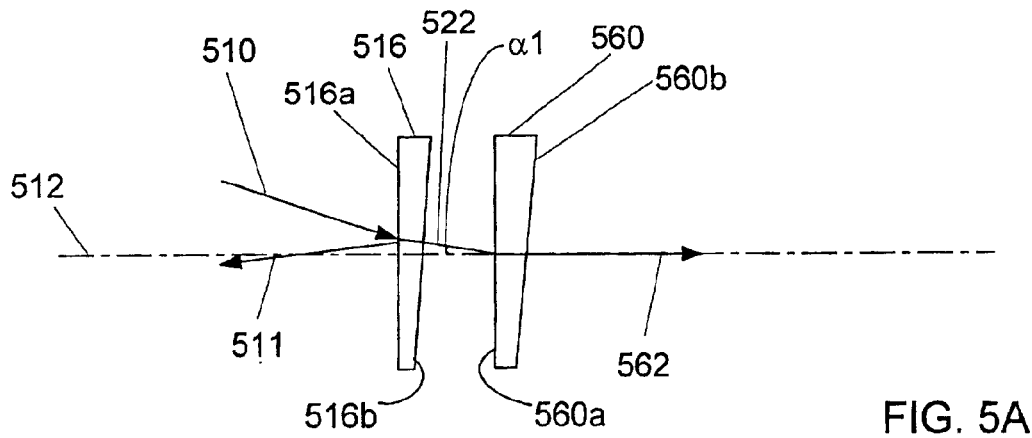
FIGS. 5A–5C schematically illustrate another embodiment of an optical fiber unit according to the present invention.
Figure 5B:
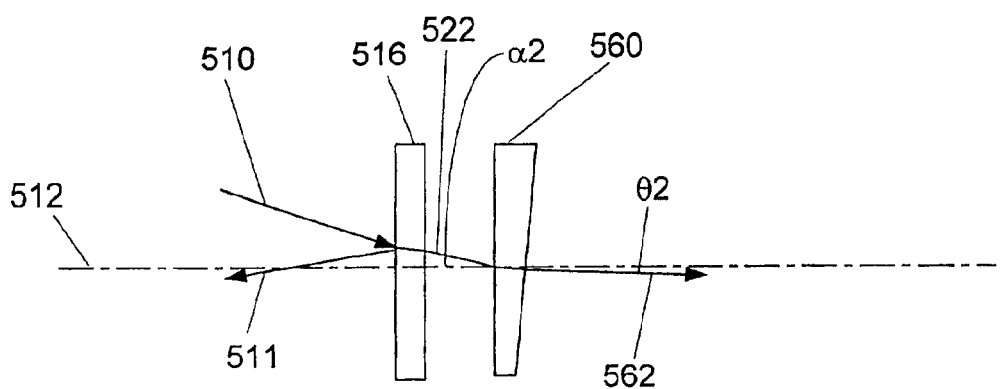

In the example illustrated in FIG. 5B, the first plate 516 has been rotated about the axis 512 by around 90°. The light 522 is incident on the second element 560 at an incident angle, α2, different from α1, with the result that the light 562 transmitted through the second element 560 propagates at an angle, θ2, relative to the axis 512.

Figure 5C:
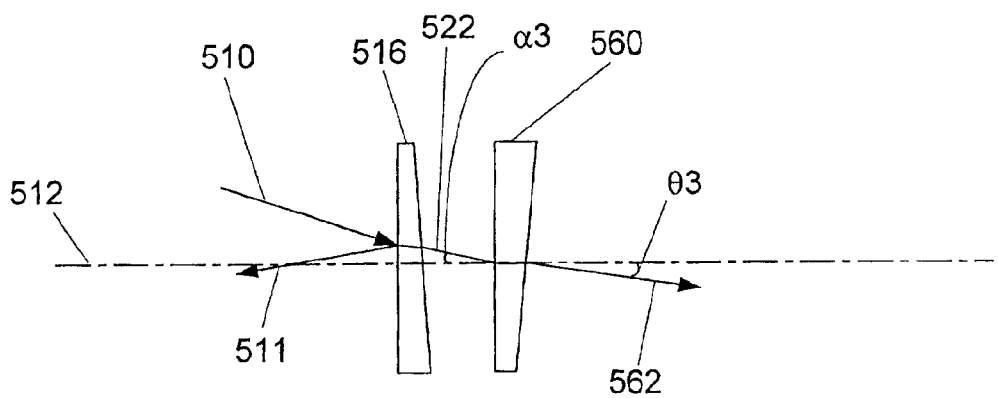

In the example illustrated in FIG. 5C, the wedged plate 516 has been rotated about the axis 512 by another 90°, so that the thick portion of the wedge is positioned towards the bottom of the figure. The light 522 is incident on the second element 560 at an angle α2, different from α1 or α2, with the result that the light 562 transmitted through the second element 560 propagates at an angle, θ3, relative to the axis 512, different from θ2.

Thus, a first wedged element 516 may be oriented about the axis 512 to select a desired angle of incidence on the second element 560 and concomitantly, the angle at which light 562 is transmitted through the second element 560. The first wedged element 516 may itself be a filter, and the two elements 516 and 518 may each be filters in a stack of filters. The second element 560 may itself be rotated about the axis 512 so as to adjust the direction of propagation of the transmitted light 562.

With reference back to FIGS. 2B and 2C, the first wedged filter 216 may be rotated around the axis 212 to adjust the angle of incidence of the light 222 on the second filter 260, and the direction of propagation of light transmitted through the second filter 260, in a manner similar to that just described for FIGS. 5A–5C.

Figure 6:
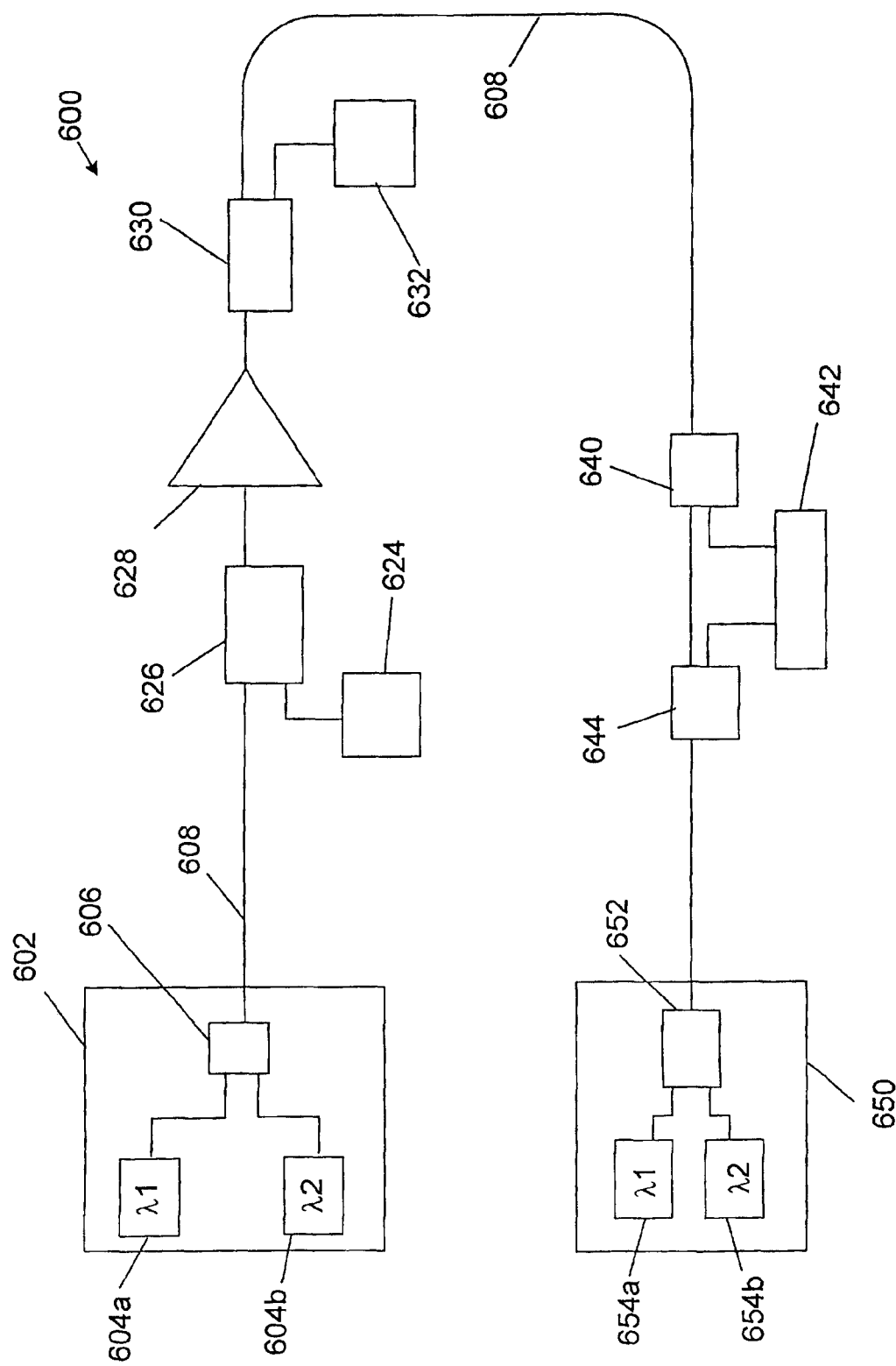
FIG. 6 schematically illustrates an optical fiber system using an optical fiber unit according to the present invention.

An embodiment of a fiber communications system 600 that uses devices according to the present invention is illustrated in FIG. 6. The system includes an optical transmitter 602 that transmits information at one or more channel wavelengths. In the illustrated embodiment, the transmitter 602 includes two modulated light sources 604a and 604b, operating respectively at λ1 and λ2. Modulated light from the modulated light sources 604a and 604b may be combined using an optical multiplexer (MUX) 606, such as a wavelength division multiplexer (WDM) to produce a multiple channel signal that is transmitted to a fiber optic communication channel 608. The multiplexer 606 may, for example, be formed using a design or method according to the present invention.

The fiber link 608 may include one or more fiber amplifiers 628, such as a Raman fiber amplifier or a rare earth-doped fiber amplifier. An example of a commonly used rare earth-doped fiber amplifier is the erbium-doped fiber amplifier. The illustrated embodiment includes only one fiber amplifier 628, but it will be appreciated that more than one fiber amplifier may be used.

The fiber amplifier 628 is typically optically pumped with light from one or more pump lasers. In the illustrated embodiment, the fiber amplifier 628 is pumped with light from one pump laser 624. The pump light from the pump laser 624 is combined into the fiber link 608 using a coupler 626. The coupler 626 may, for example, be formed using a design or method according to the present invention.

The link 608 may be provided with a monitor 632 for monitoring the distribution of optical power in the multichannel signal. An optical tap 630, that taps off a small fraction of the light in the signal propagating along the link 608, couples tapped light into the monitor 632. The optical tap 630 may incorporate the present invention.

The link 608 may also include one or more add/drop multiplexers 640 and 644. In a drop configuration, an add/drop multiplexer picks off one or more channels from a multiple channel signal. For example, if the signal carries channels at λ1 and λ2, the add/drop multiplexer may pick off the signal at λ1 and transmit it to another fiber system 642, for example a local loop or the like. The fiber system 642 may also generate a signal at λ1 that is added to the fiber link 608 using an add/drop multiplexer in an add configuration. The add/drop multiplexers 640 and 644 may each incorporate the present invention.

The optical receiver 650 receives a multiple channel optical information signal from the fiber link 608 and typically demultiplexes the signal before detecting the individual channels. In the illustrated embodiment, the optical receiver 650 receives two channels, but it will be understood that the optical receiver may receive more than two channels. The light from the fiber link 608 is passed into a wavelength division demultiplexer (DMUX) 652 which separates the two channels at wavelengths λ1 and λ2 and directs the individual channels to their respective detectors 654a and 654b. The DMUX 652 may be fabricated according to the present invention.

As noted above, the present invention is applicable to fiber optic devices and is believed to be particularly useful in fiber optic devices that use one or more dual fiber collimator units, such as filter units. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification.

We claim:

1. A fiber collimator unit, comprising:
   a first focusing element having an optical axis and a first focal length;
   a first optical fiber optically coupled to a first side of the first focusing element, the first optical fiber being disposed at a first transverse distance from the optical axis so that light from the first optical fiber propagates on a second side of the first focusing element as a substantially collimated beam at a first angle to the optical axis;
   a wedged optical element optically coupled to the second side of the first focusing element, the wedged optical element deviating the substantially collimated beam so as to propagate in a direction substantially parallel to the optical axis, the wedged optical element including a reflecting surface to reflect light from the first fiber to a second fiber disposed on the first side of the first focusing element; and
   a deviating plate disposed on a side of the wedged optical element away from the first focusing element to deviate the substantially collimated beam that is transmitted through the wedged optical element.

2. A unit as recited in claim 1, wherein the second optical fiber is disposed at a second transverse distance from the optical axis, on a side of the optical axis opposite the first optical fiber, to receive light reflected from the wedged optical element and focused by the first focusing element.

3. A unit as recited in claim 2, wherein the first and second optical fibers are mounted in a dual-fiber ferrule.

4. A unit as recited in claim 1, wherein the substantially collimated beam is incident on the reflecting surface where the substantially collimated beam crosses the optical axis.

5. A unit as recited in claim 1, wherein the deviating plate is disposed at an angle so that the collimated beam propagates from the deviating plate substantially aligned on the optical axis.

6. A unit as recited in claim 1, wherein the wedged optical element is an optical filter.

7. A unit as recited in claim 6, wherein the filter substantially reflects light within a pre-determined wavelength range and substantially transmits light outside the pre-determined wavelength range.

8. A unit as recited in claim 1, further comprising a second focusing element disposed to focus light transmitted through the wedged optical element.

9. A unit as recited in claim 8, further comprising a third fiber disposed to receive light focused by the second focusing element.

10. A unit as recited in claim 1, further comprising a filter disposed on the optical axis.

11. A unit as recited in claim 1, wherein the wedged optical element has a wedge angle in excess of 2°.

12. An optical system, comprising:
    an optical transmitter producing output light;
    an optical receiver receiving at least a portion of the output light; and
    an optical fiber link coupling between the optical transmitter and the optical receiver, the optical fiber link including
    a first optical fiber optically coupled to the optical transmitter,
    a first focusing element having an optical axis and a focal length, the first optical fiber and a second optical fiber being positioned on an input side of the first focusing element on opposite sides of the optical axis and at a distance from the first focusing element of approximately the focal length so that light from the first optical fiber propagates on a second side of the first focusing element as a substantially collimated beam at a first angle to the optical axis,
    a wedged optical element optically disposed on a second side of the first focusing element, the wedged optical transmitting at least a portion of the substantially collimated beam in a direction substantially parallel to the optical axis, the wedged optical element including a reflecting surface to reflect light from the first fiber to the second optical fiber
    a second focusing element disposed to focus light transmitted by the wedged optical element to a third optical fiber, and
    a deviating plate between the wedge optical element and the deviate the substantially collimated transmitted from the wedged optical element substantially parallel to the optical axis,
    the optical receiver being optically coupled to receive light from one of the second and the third optical fibers.

13. A system as recited in claim 12, further comprising one or more optical amplifier units disposed on the optical fiber link between the optical transmitter and the optical receiver.

14. A system as recited in claim 12, wherein the optical transmitter includes modulated light sources operating at different wavelengths and optical combining elements to combine outputs from the modulated light sources into a fiber output coupled to the optical fiber link.

15. A system as recited in claim 12, wherein the optical receiver includes optical separating elements to separate different wavelengths of light received from the optical fiber link and to direct light at different wavelengths to respective detectors.

16. A system as recited in claim 12, wherein the deviating plate is disposed at an angle so that the collimated beam propagates from the deviating plate substantially aligned along the optical axis.

17. An optical unit, comprising:
    a first focusing unit defining an optical axis;
    a second focusing unit spaced apart from the first focusing unit;
    at least first and second fiber ports disposed on a first side of, and optically coupled through, the first focusing element;
    at least a third fiber port on a second side of the second focusing unit opposite the first focusing unit;
    a wedged optical element disposed between the first and second focusing units to direct collimated light passing from the first fiber port to the third fiber port to be substantially parallel to the optical axis;
    a deviating plate disposed on the optical axis to deviate the light propagating from the wedged optical element to the third fiber port; and
    a reflecting surface disposed between the first focusing unit and the deviating plate to reflect light from the first fiber port to the second fiber port.

18. A unit as recited in claim 17, wherein the reflecting surface is disposed on the wedged optical element.

19. A unit as recited in claim 17, wherein the reflecting surface is disposed on another optical element disposed between the first focusing unit and the deviating plate.

20. A unit as recited in claim 17, wherein the reflecting surface substantially reflects light within a pre-determined wavelength range and substantially transmits light outside the pre-determined wavelength range.

21. A unit as recited in claim 17, wherein the first and second optical fiber ports are mounted in a dual-fiber ferrule.

22. A unit as recited in claim 17, wherein the deviating plate is disposed on the optical axis at such an angle so as to align the light propagating from the first fiber port on the optical axis.

23. A unit as recited in claim 17, wherein the wedged optical element has a wedge angle in excess of 2°.

24. A method of aligning light in an in-line fiber optic device, the method comprising:

transmitting light from a first port disposed towards a first end of the device through a wedged optical element disposed on an optical axis;

propagating the light transmitted through the wedged optical element to a second optical element disposed on the optical axis;

rotating the wedged optical element about the optical axis to adjust an angle of incidence of the light on the second optical element to a desired value of the angle of incidence;

transmitting light to the second optical element from a fourth port disposed towards a second end of the device to the second port; and reflecting light in a selected wavelength range from the first optical element to a second port disposed towards the first end of the device.

25. A method as recited in claim 24, further comprising transmitting light through the second optical element to a third port disposed towards a second end of the device.

26. A method as recited in claim 24, further comprising rotating the second optical element about the optical axis to adjust an angle between light transmitted through the second optical element and the optical axis.

27. A method of aligning light in an in-line fiber optic device, the method comprising:

transmitting light from a first port disposed towards a first end of the device through a wedged optical element disposed on an optical axis;

propagating the light transmitted through the wedged optical element to a second optical element disposed on the optical axis;

rotating the wedged optical element about the optical axis to adjust an angle of incidence of the light on the second optical element to a desired value of the angle of incidence; and reflecting light in a selected wavelength range from the second optical element to a second port disposed towards the first end of the device.

28. A method as recited in claim 27, further comprising transmitting light through the second optical element to a third port disposed towards a second end of the device.

29. A method as recited in claim 27, further comprising transmitting light to the second optical element from a fourth port disposed towards a second end of the device to the second port.

30. A method as recited in claim 27, further comprising rotating the second optical element about the optical axis to adjust an angle between light transmitted through the second optical element and the optical axis.

31. A method as recited in claim 27, wherein the second optical element is a filter.

* * * * *